United States Patent [19]

Tokashiki et al.

[11] Patent Number: 5,200,678
[45] Date of Patent: Apr. 6, 1993

[54] MOTOR DRIVING CONTROL APPARATUS

[75] Inventors: Mutuo Tokashiki, Narashino; Kazumasa Sugiyama, Funabashi; Sumio Kobayashi, Chiba; Hiroshi Sugai, Sakura; Kazuyuki Nakagawa, Ichikawa, all of Japan

[73] Assignees: Hitachi, Ltd., Tokyo; Hitachi Keiyo Engineering Co., Ltd., Chiba, both of Japan

[21] Appl. No.: 609,660

[22] Filed: Nov. 6, 1990

[30] Foreign Application Priority Data

Nov. 24, 1989 [JP] Japan ................... 1-303171

[51] Int. Cl.⁵ .................................. G05B 19/42
[52] U.S. Cl. .................. 318/568.13; 318/606; 318/603
[58] Field of Search ............. 318/610, 612, 615, 616, 318/618, 625, 563, 586.13, 586.15, 586.16, 606, 603, 565, 490; 364/565; 324/166, 546, 383, 178

[56] References Cited

U.S. PATENT DOCUMENTS

| | | |
|---|---|---|
| 4,109,185 | 8/1978 | Froyd et al. ................... 318/603 |
| 4,379,987 | 4/1983 | Kohzai et al. ................... 318/563 |
| 4,422,040 | 12/1983 | Raider et al. ................... 318/490 |
| 4,424,472 | 1/1984 | Jacot-Descombes et al. ................... 318/568.13 |
| 4,445,184 | 4/1984 | Noguchi ................... 318/568.13 |
| 4,654,569 | 3/1987 | Mizumoto et al. ................... 318/568.13 |
| 4,837,508 | 6/1989 | Garnault ................... 364/565 |
| 4,843,292 | 6/1989 | Ono et al. ................... 318/606 |
| 4,912,650 | 3/1990 | Tanaka et al. ................... 318/568.13 |
| 4,954,761 | 9/1990 | Kimura et al. ................... 318/568.13 |

*Primary Examiner*—William M. Shoop, Jr.
*Assistant Examiner*—John W. Cabeca
*Attorney, Agent, or Firm*—Anntonelli, Terry, Stout & Kraus

[57] ABSTRACT

A motor driving control apparatus having a function for performing an individual test operation of a servomotor driving control apparatus or an inverter apparatus by generating test operation command in the control apparatus in place of a command from an external controller, whereby both a function check and a performance check can be performed to attain an improvement in reliability and case of operation.

21 Claims, 5 Drawing Sheets

MOTOR DRIVING CONTROL APPARATUS

BACKGROUND OF THE INVENTION

The present invention relates to an apparatus for driving an electric motor according to a control command supplied from an external apparatus such as an external computer or the like so as to control at least one of the rotational position and rotational speed of the motor, and particularly relates to a motor driving control apparatus suitable for the driving control of a servomotor used in robots and various kinds of numerically controlled machine tools.

In general, in order to drive a servomotor used in robots and various kinds of machine tools, driving power is supplied to the motor through a servo amplifier and the result is fed back by means of an encoder so that motor control exactly corresponding to a control command given from the outside can be attained. An example of this type motor driving control apparatus can be found in Japanese Patent Unexamined Publication JP-A-62-193585.

In such a motor driving control apparatus, the control apparatus does not operate if no control command is supplied from the outside. In short, the motor cannot be driven without a control command.

Accordingly, it is difficult for the apparatus per se to judge whether or not the function thereof is kept normal.

In the above prior art, a test operation based on a feedback control pulse signal can be made. However, the prior art has no special consideration in making checking possible as to whether or not the function is normal with respect to the control command given from the outside. There arises therefore a problem in a complete function maintenance check of the apparatus which has been not yet installed in a robot, a machine tool or the like.

SUMMARY OF THE INVENTION

An object of the present invention is to provide a motor driving control apparatus in which the motor driving control apparatus as well as motor can be checked to determine whether they are in a perfect state before they are installed in a system such as a robot, a machine tool, or the like.

To attain the foregoing object, the motor driving apparatus according to the present invention comprises an internal control command generation means for generating a control command of a predetermined pattern to operate the motor; and a control command selection means for desiredly selecting one of an externally supplied control command and the control command supplied from the internal control command generation means to thereby control motor.

According to the present invention, the control command selection means is operated so as to select a control command from the internal control command generation means so that the motor driving control apparatus can obtain a control command necessary for individually controlling the driving of the motor. Accordingly, the same operation as that in the case where a control command is supplied from the outside can be obtained, so that a function check can be made easily.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Figure 1:
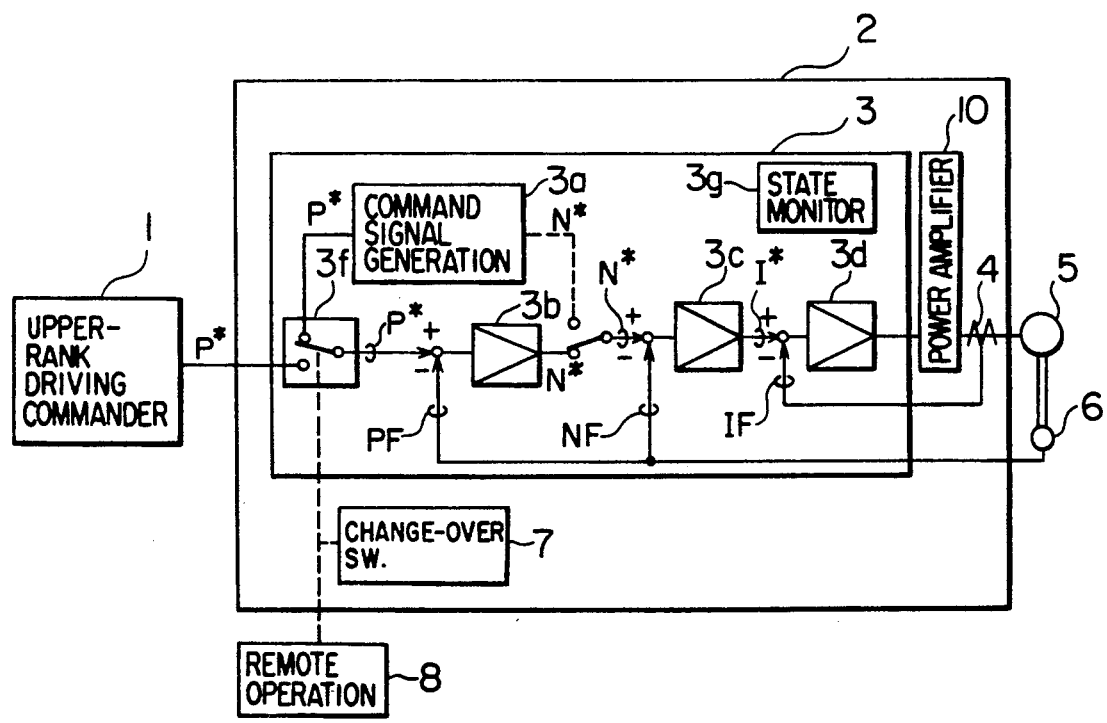
FIG. 1 is a block diagram showing an embodiment of the present invention applied to a servomotor driving control apparatus.

The motor driving control apparatus according to the present invention will be described hereunder in greater detail with respect to the embodiments illustrated in the drawings.

FIG. 1 shows an embodiment in which the present invention is applied to a servomotor driving control apparatus which is used in a robot, a numerically controlled machine tool, or the like. In FIG. 1, the reference numeral 1 designates a driving commander apparatus which ranks higher in a control hierarchy than the motor driving control apparatus. The driving commander apparatus 1 is constituted by a control computer, a programmable controller, a data setter for setting various kinds of data, a pulse-train generator, and so on.

The reference numeral 2 designates a servo controller, 3 a micro-computer (one-chip micro-computer) constituting the servo controller 2, 4 a current detector, 5 a servomotor, 6 an encoder and 7 a changeover switch.

In the micro-computer 3, incorporated are functions, in the form of software, necessary for the servo controller, such as an automatic position control amplifier portion 3b, an automatic speed control amplifier portion 3c, an automatic current control amplifier portion 3d, etc. In the micro-computer 3 are further incorporated, also in the form of software, a command signal generation portion 3a and a state monitor portion 3g. Of course, though not shown, storage means such as a ROM, a RAM and the like are provided in the microcomputer 3.

The current detector 4 serves to detect a value of current supplied to the servomotor 5 from the automatic current control amplifier portion 3d to thereby output the current value as a current feedback signal IF.

The encoder 6 serves to detect the rotational position, the rotational speed and the like, of the servomotor 5 to thereby outputs them as a position feedback signal PF and a rotational speed feedback signal NF.

The reference numeral 3f designates a switch constituted by a software function, such as for an input port switching function, of the micro-computer 3. The switch 3f serves to select a desired one, as a position command P* of the micro-computer 3, of the signal supplied from the external driving commander apparatus 1 and the signal supplied from the internal command signal generation portion 3a. The switch 3f is controlled by an input operation by a human operator through a remote operation device 8 (which will be described later in detail).

Figure 3:
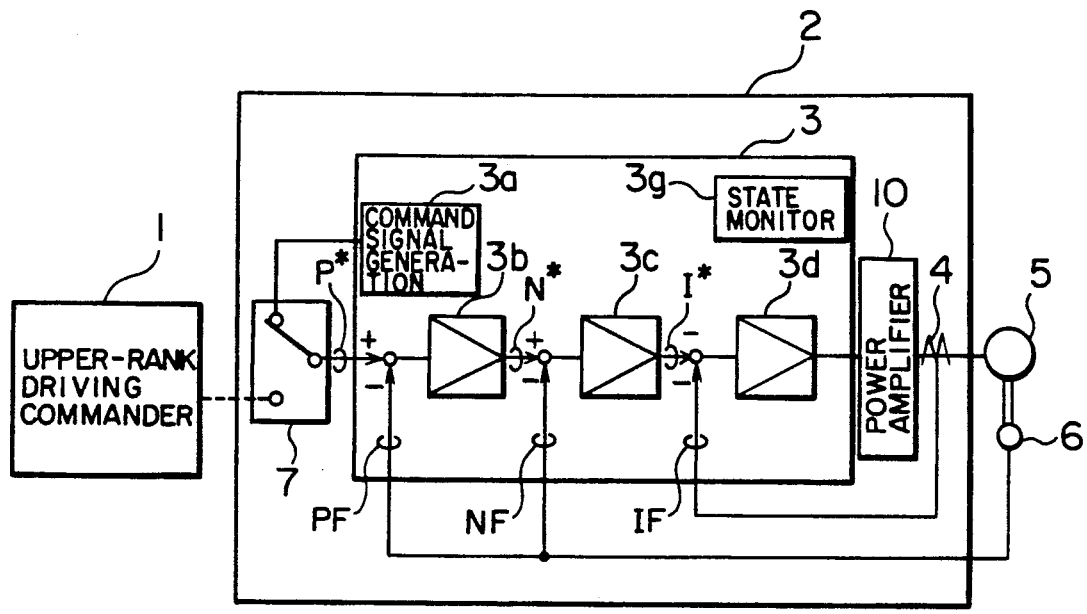
FIG. 3 is a block diagram showing the embodiment of FIG. 1 modified to include a changeover switch which is directly operated by an operation.

As shown in the embodiment of FIG. 3, a changeover switch 7 constituted by a snap switch or the like directly operated by a human operator may be provided to have a hardware function for switching the pattern of position command P*. The reference numeral 10 designates a power amplifier section.

In the following, the operation of the apparatus in this embodiment is described.

The operation of the motor driving control apparatus installed in a robot, a numerically controlled machine tool or the like after the switching position of the changeover switch 7 has been set to the external driving commander apparatus 1 is the same as that of the conventional apparatus. That is, the apparatus is operated according to a position command P* given from the driving commander apparatus 1, so that a speed command N* is generated in the automatic position control amplifier portion 3b. The speed command N* is fed to the automatic speed control amplifier portion 3c to form a current command I* to be fed to the automatic current control amplifier portion 3d. At this time, the current supplied to the servomotor 5 and the rotational position and rotational speed given by the servomotor 5 are fed back as feedback signals IF, PF and NF, respectively. Accordingly, exact control of the servomotor 5 in accordance with the position command P* supplied from the driving commander apparatus 1 is secured.

In the case where a function check is required as to whether all functions of the motor driving control apparatus are operable or in the case where a performance check is required before the apparatus is installed in a robot, a machine tool or the like, the switching portion 3f is operated to the position for inputting the signal from the internal command signal generation portion 3a.

At this time, the position command P* generated from the command signal generation portion 3a is fed to the automatic position control amplifier portion 3b, so that the servomotor 5 can be operated individually by the motor driving control apparatus in an operation form suitable to the function check or the performance check. Accordingly, the function check or the performance check can be made suitably and easily before the apparatus is installed in a robot, an NC machine tool or the like. Accordingly, failure, lowering of reliability, and the like, can be prevented from occurring.

As described above, the command signal generation portion 3a is designed so as to generate a test-operation position command P* (or a speed command N*) of a predetermined pattern useful for the function check or the performance check of the whole of the motor driving control apparatus including the servomotor 5 by software processing of the micro-computer 3. Therefore, a program necessary for generating this pattern is stored in the micro-computer 3 in advance, so that the position command P* of this pattern is issued automatically. Further, a function for inputting programs through the remote operation device and a memory function necessary for storing the programs may be provided to generate and store this pattern suitably by a user or the like.

Figure 2:
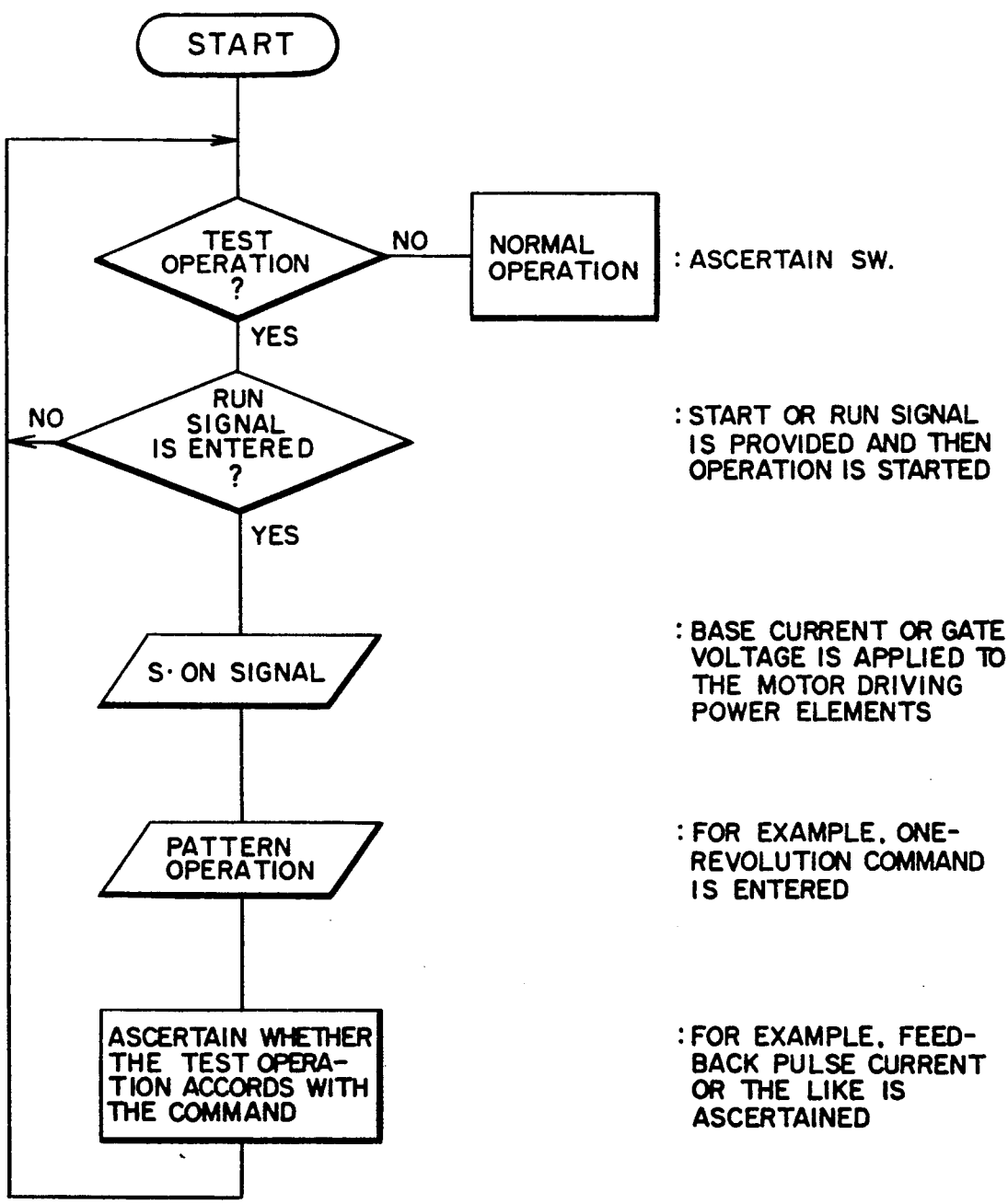
FIG. 2 is a flow chart showing the details of control processing in the embodiment of FIG. 1.

An embodiment of processing executed by the micro-computer 3 suitable for the aforementioned operation will be described below with reference to FIG. 2.

When processing starts, a judgment is made in Step 1 as to whether or not the test operation is designated. The judgment can be made by examining the switching position of the changeover switch 7.

When, for example, the changeover switch 7 is in the position to select the external driving commander apparatus, the processing is shifted to the execution of the ordinary operation.

Thereafter, the operation of a predetermined pattern is carried out according to the position command P* generated from the command signal generation portion 3a. When it is confirmed that the operation of this pattern is attained perfectly, the test operation is terminated. Occurrence of a trip (abnormal cutoff) is always monitored during the test operation so that a trip processing can be carried out preferentially.

After the test operation is terminated, the current supplied to the servomotor 5 may be cut off or the state of current supply may be fixed after the movement of the servomotor 5 to the designated stop position so that the operation check can be made in a so-called servo-lock state.

Further, the apparatus may be designed to be suitable for the individual test operation of only the servo controller 2 without connecting the servomotor 5 to the servo controller 2. At this time, the judgment as to whether the test operation of the servomotor is normal or not may be performed based on the detection of an abnormality of an output signal of the encoder 6. Alternatively, the judgment may be performed based on the failure of switching elements such as transistors in the motor driving circuit without performing the detection of the abnormality of the output signal of the encoder 6.

A test operation pattern suitable for producing accelerative and decelerative motion of the motor may be used. In this case, the current takes a maximum value (a limit value in a current control system) at each of the time of acceleration and the time of deceleration so that a safety check can be made. It is a matter of course that the operation pattern may be provided so as to be suitable for a performance check of the apparatus. The judgment as to whether the operation state is normal is made in the state monitor portion 3g in FIG. 1.

Although the aforementioned embodiment has shown the case where the present invention is applied to a servomotor driving control apparatus, it is to be understood that the present invention may be applied to an inverter for driving an induction motor. In this case, the inverter corresponds to the servo controller 2 in FIG. 1.

Figure 4:
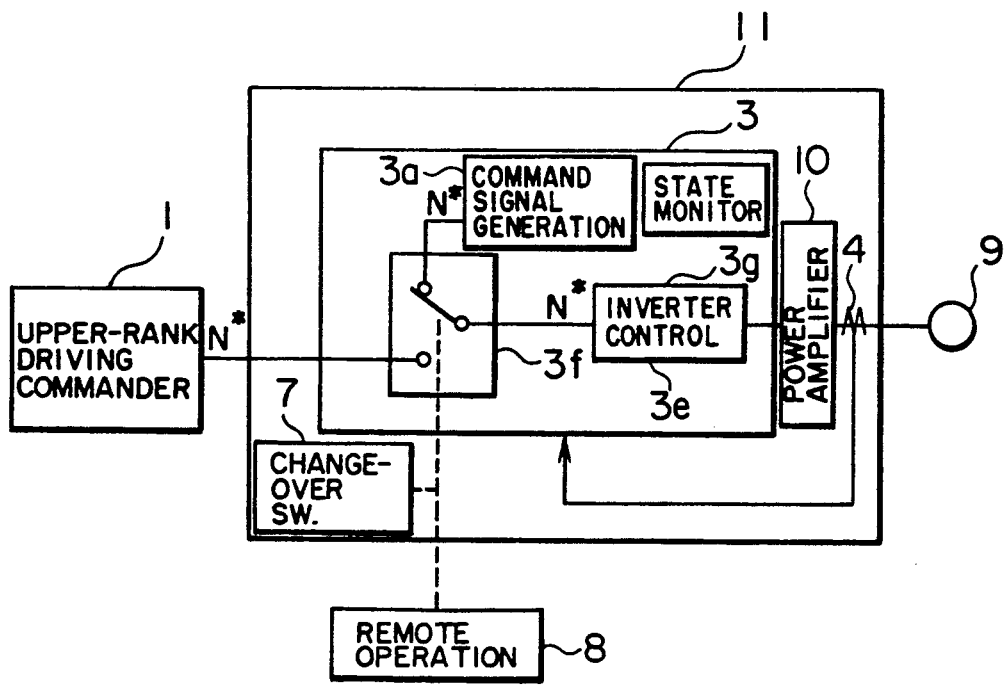
FIG. 4 is a block diagram showing an embodiment of the present invention applied to an inverter for driving an induction motor.

A specific example of the inverter is shown in FIG. 4. In FIG. 4, the reference numeral 3e designates an inverter control portion for controlling output voltage and frequency, 9 an AC motor and 11 an inverter apparatus. Like numerals in each of the drawings refer to like parts.

In general, the inverter is operated on the basis of a control signal from the outside to control the operation of the induction motor in accordance with a predetermined pattern. In this embodiment, a command signal generation portion 3a is provided inside of the apparatus. Accordingly, the inverter can be operated alone without any position command P* and any speed command N* being issued from the external driving commander apparatus 1. Accordingly, a function check and a performance check can be easily performed to attain an improvement in reliability.

Figure 5:
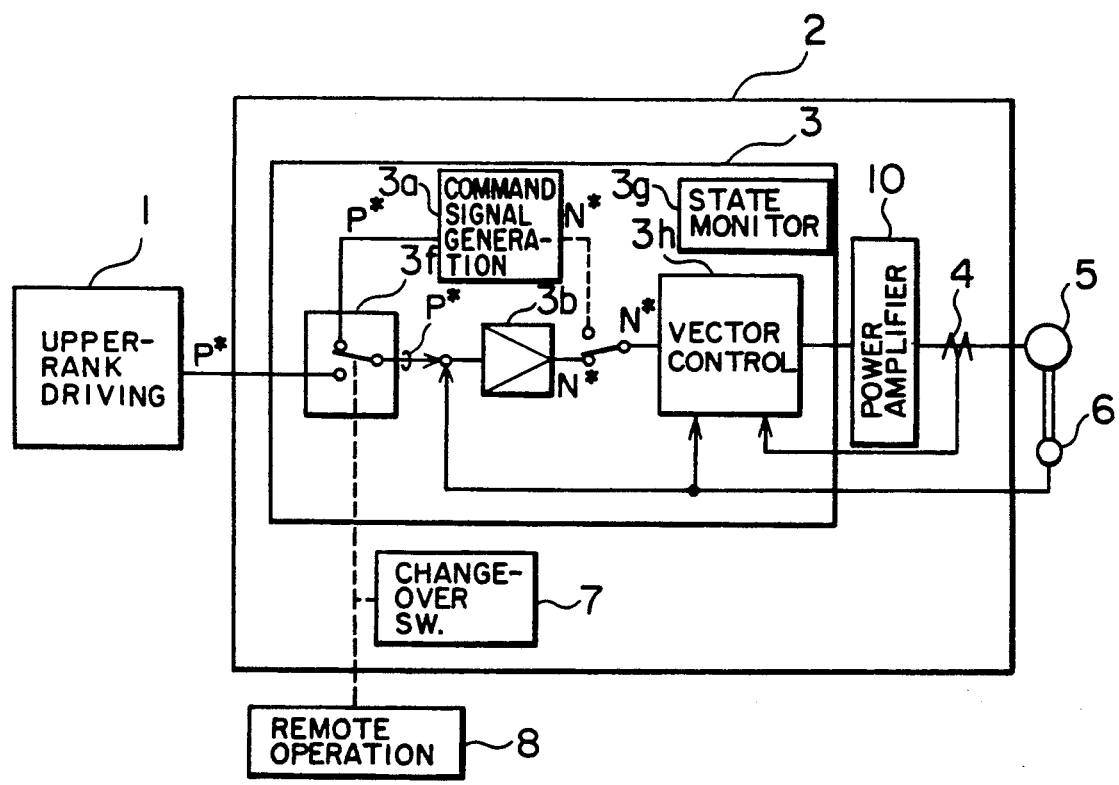
FIG. 5 is a block diagram showing the embodiment of FIG. 4 modified to use vector control.

FIG. 5 shows an embodiment in which the parts 3c and 3d in FIG. 1 are replaced by a vector control portion 3h. The vector control is well known such that a detailed description thereof can be omitted.

A further embodiment will be described below with reference to FIGS. 6 and 7.

Figure 6:
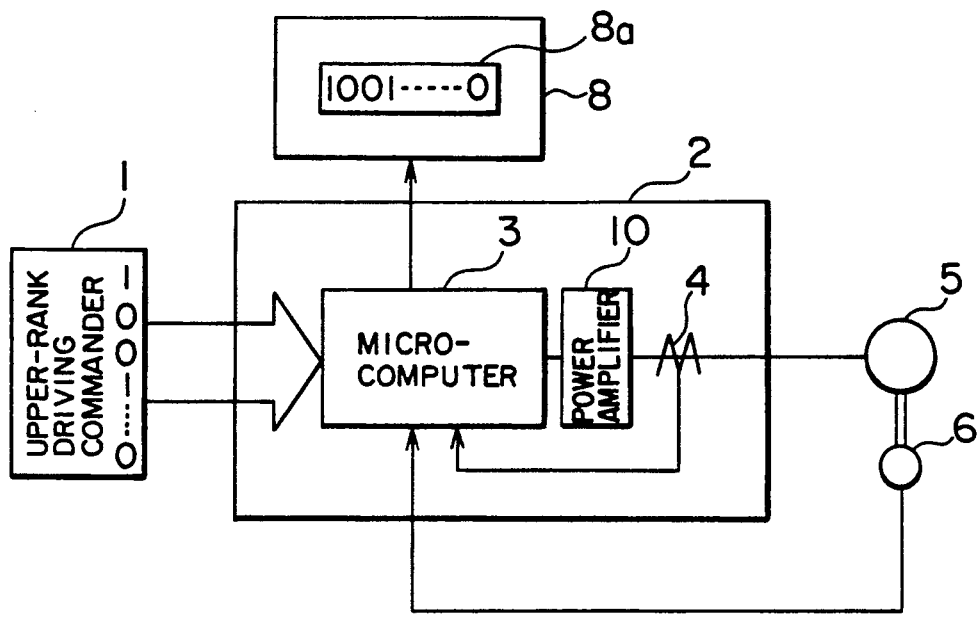
FIG. 6 is a block diagram showing details of a remote operation device of the present invention.
Figure 7:
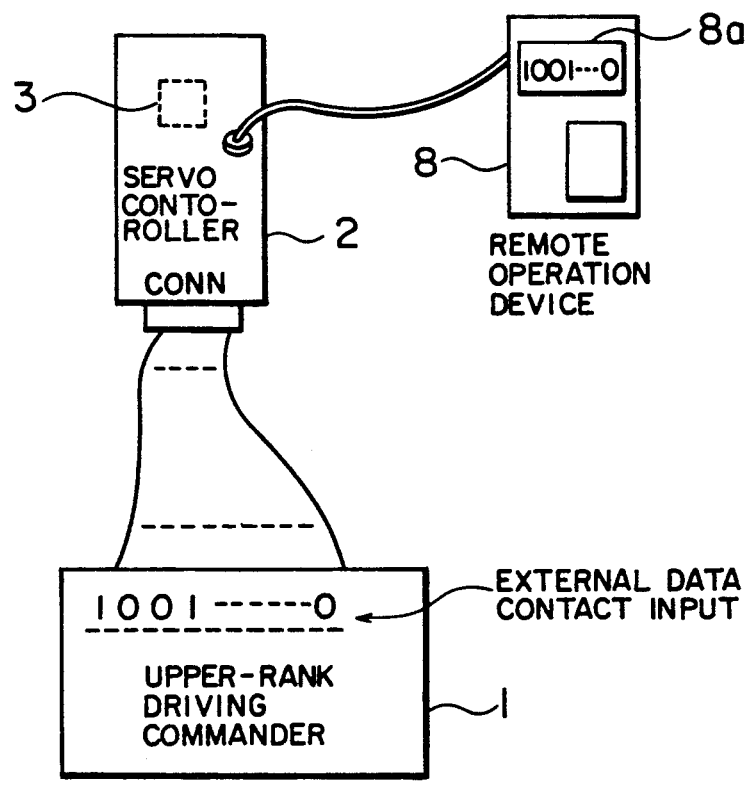
FIG. 7 is a view of the external appearance of the apparatus of FIG. 6.

FIG. 6 shows an internal block construction in this embodiment, and FIG. 7 shows an external appearance in this embodiment. In FIGS. 6 and 7, the reference numeral 8 designates a remote operator: device having a on-line multi-bit display unit 8a. The remote operation device 8 serves to directly receive data, such as a position command P*, a speed command N*, and the like, input to the micro-computer 3 from the external driving commander apparatus 1, give a meaning to the "row" and "column" of the data and display the data.

On the other hand, in this embodiment, the micro-computer has a predetermined communication function corresponding to the remote operation device 8, so that the data input from the outside and received by the micro-computer 3 can be transmitted back to the remote operation device 8.

In this embodiment, accordingly, data input from the outside can be visually confirmed bit by bit by an operator, so that the external data and the interface for inputting the external data can be checked to attain a greater improvement in reliability.

In this embodiment, at that time, data are displayed and monitored by using the display unit 8a provided in the remote operation device 8 which is included in the motor driving control apparatus. Accordingly, there is little fear of increase in cost.

Although the aforementioned embodiment also has shown the case where the present invention is applied to a servomotor driving control apparatus, it is to be understood that the present invention may be applied to an inverter for driving an induction motor.

In short, the servo controller 2 may be replaced by an inverter so that data input to the inverter from the driving commander apparatus 1 can be displayed in the display unit 8a of the remote operation device 8. Also in this case, a function check, inclusive of the check of an interface to the external apparatus, can be made to attain a sufficient improvement in reliability.

In the embodiment as shown in FIGS. 6 and 7, the display unit 8a of the remote operation device 8 is, in general, used at the time of generation of programs by means of the remote operation device 8. Accordingly, the display unit 8a is not always optimum for displaying data. In this case, therefore, an exclusive-use display unit may be further provided for the purpose of displaying data.

According to the present invention, the test operation of the motor driving control apparatus can be carried out individually and desiredly even before the apparatus is installed in a system. Accordingly, both a function check and a performance check can be made easily to attain a sufficient improvement in reliability and handling property.

What is claimed is:

1. A motor driving control apparatus for driving a motor according to a control command from an external apparatus, in which said motor driving control apparatus comprises:
   test operation control command generation means for generating a control command having a predetermined pattern for driving said motor in a test operation;
   control command selection means for selecting one of the control command from said external apparatus and the control command from said test operation control command generation means as a control command for said motor; and
   operation analysis means for analyzing an operation of said motor in accordance with the control command from said test operation control command generation means, thereby providing said motor driving control apparatus with a self-diagnosis function.

2. A motor driving control apparatus according to claim 1, in which said test operation control command generation means is provided inside a main body of said motor driving control apparatus.

3. A motor driving control apparatus according to claim 1, in which said test operation control command generation means is provided inside a remote operation device.

4. A motor driving control apparatus according to claim 1, in which said test operation control command generation means includes means for selectively setting and rewriting said control command having a predetermined pattern.

5. A motor driving control apparatus according to claim 4, in which said means for selectively setting and rewriting includes data input means which includes a remote operation device.

6. A motor driving control apparatus according to claim 4, in which said means for selectively setting and rewriting includes data input means which includes an operation panel provided on a surface of said motor driving control apparatus.

7. A motor driving control apparatus for driving a motor according to a control command from an external apparatus and for performing feedback control for at least one of a rotational position and a rotational speed of said motor, in which said motor driving control apparatus comprises:
   test operation control command generation means for generating a control command having a predetermined pattern for driving said motor in a test operation;
   control command selection means for selecting one of the control command from said external apparatus and the control command from said test operation control command generation means as a control command for said motor; and
   operation analysis means for analyzing an operation of said motor in accordance with the control command from said test operation control command generation means, thereby providing said motor driving control apparatus with a self-diagnosis function.

8. A motor driving control apparatus according to claim 7, in which said test operation control command generation means is provided inside a main body of said motor driving control apparatus.

9. A motor driving control apparatus according to claim 7, in which said test operation control command generation means is provided of inside of a remote operation device.

10. A motor driving control apparatus according to claim 7, in which said test operation control command generation means includes means for selectively setting and rewriting said control command having a predetermined pattern.

11. A motor driving control apparatus according to claim 10, in which said means for selectively setting and rewriting includes data input means which includes a remote operation device.

12. A motor driving control apparatus according to claim 10, in which said means for selectively setting and rewriting includes data input means which includes an operation panel provided on a surface of said motor driving control apparatus.

13. A method of operating a motor driving control apparatus having test operation control command generation means for generating a control command having a predetermined pattern for driving a motor in a test operation, which comprises the steps of:
   determining whether the motor driving control apparatus is to be operated in an external control command operation mode or a test operation mode;
   operating the motor driving control apparatus according to the control command from the test operation control command generation means to drive the motor in the test operation when the motor driving control apparatus is to be operated in the test operation mode; and
   ascertaining whether an operation of the motor in the test operation is in accordance with said control command having a predetermined pattern.

14. A motor driving control apparatus according to claim 1, further comprising monitor display means for monitoring and displaying data of the control command from said external apparatus.

15. A motor driving control apparatus according to claim 14, in which said monitor display means is a remote operation device.

16. A motor driving control apparatus for driving a motor according to a control command from an external apparatus, in which said motor driving control apparatus comprises a micro-controller section, a power amplifier section, and a change-over commander section, said micro-controller section including:
   test operation control command generation means for generating a control command having a predetermined pattern for driving said motor in a test operation;
   control command selection means for selecting one of the control command from said external apparatus and the control command from said test operation control command generation means, based on a command signal from said change-over commander section, as a control command for said motor;
   an automatic position control portion;
   an automatic speed control portion;
   an automatic current control portion; and
   operation analysis means for analyzing an operation of said motor in accordance with the control command from said test operation control command generation means.

17. A motor driving control apparatus according to claim 16, in which said micro-controller section is constituted by a one-chip micro-controller.

18. A motor driving control apparatus for driving a motor according to a control command from an external apparatus, in which said motor driving control apparatus comprises a micro-controller section, a power amplifier section, and a change-over commander section, said micro-controller section including:
   test operation control command generation means for generating a control command having a predetermined pattern for driving said motor in a test operation;
   an automatic position control portion;
   an automatic speed control portion;
   an automatic current control portion; and
   operation analysis means for analyzing an operation of said motor in accordance with the control command from said test operation control command generation means.

19. A motor driving control apparatus according to claim 18, in which said micro-controller section is constituted by a one-chip micro-controller.

20. A motor driving control apparatus for driving a motor according to a control command from an external apparatus, in which said motor driving control apparatus comprises a micro-controller section, a power amplifier section, and a change-over commander section, said micro-controller section including:
   test operation control command generation means for generating a control command having a predetermined pattern for driving said motor in a test operation;
   control command selection means for selecting one of the control command from said external apparatus and the control command from said test operation control command generation means, based on a command signal from said change-over commander section, as a control command for said motor;
   an automatic position control portion;
   a vector control arithmetic operation portion; and
   operation analysis means for analyzing an operation of said motor in accordance with the control command from said test operation control command generation means.

21. A motor driving control apparatus according to claim 20, in which said micro-controller section is constituted by a one-chip micro-controller.

* * * * *